(12) United States Patent
Cai (10) Patent No.: US 11,876,920 B2
(45) Date of Patent: Jan. 16, 2024

(54) MOBILE PHONE SUPPORT

(71) Applicant: SHENZHEN DEONE INNOVATION TECHNOLOGY CO., LTD, Shenzhen (CN)

(72) Inventor: Jiongjun Cai, Shenzhen (CN)

(73) Assignee: SHENZHEN DEONE INNOVATION TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/053,757

(22) Filed: Nov. 9, 2022

(65) Prior Publication Data
US 2023/0362288 A1    Nov. 9, 2023

(30) Foreign Application Priority Data
May 7, 2022 (CN) .......................... 202221078397.2

(51) Int. Cl.
| F16M 11/04 | (2006.01) |
| H04M 1/04 | (2006.01) |
| F16M 11/38 | (2006.01) |
| F16M 11/12 | (2006.01) |
| F16M 13/00 | (2006.01) |

(52) U.S. Cl.
CPC ............ *H04M 1/04* (2013.01); *F16M 11/125* (2013.01); *F16M 11/38* (2013.01); *F16M 13/00* (2013.01)

(58) Field of Classification Search
CPC ....... H04M 1/04; F16M 11/125; F16M 11/38; F16M 13/00
See application file for complete search history.

(56) References Cited

U.S. PATENT DOCUMENTS

| 9,379,759 | B2* | 6/2016 | Platt ..................... H04B 1/3888 |
| 10,274,814 | B2* | 4/2019 | Jeon ..................... F16M 13/022 |
| 10,326,487 | B2* | 6/2019 | Mody ..................... A45C 11/00 |
| 10,855,821 | B1* | 12/2020 | Chou .................... H04B 1/3877 |
| 11,039,679 | B2* | 6/2021 | Jang ..................... A45C 11/00 |
| 2011/0164358 | A1* | 7/2011 | Duan .................... H05K 5/0234 361/679.01 |
| 2012/0262897 | A1* | 10/2012 | Hsu ..................... H04M 1/0216 361/807 |
| 2012/0275094 | A1* | 11/2012 | Zhou ..................... F16M 11/10 361/679.01 |
| 2016/0066453 | A1* | 3/2016 | Quehl ..................... A45C 11/00 206/45.2 |

(Continued)

*Primary Examiner* — Amy J. Sterling (57) ABSTRACT

A mobile phone support configured to support a mobile phone includes a housing and an adjusting assembly. The housing includes a top housing and a bottom housing. The top housing is opposite to the bottom housing. The top housing faces the mobile phone. An opening portion is formed on the bottom housing. The adjusting assembly is at least partially slidably connected between the bottom housing and the top housing. The adjusting assembly has a closed form and an open form relative to the opening portion. A rotation angle of the adjusting assembly is adjustable relative to the housing. The present disclosure achieves adjustment of a supporting angle of the mobile phone, enhances supporting stability after mutual conversion of a vertical state and a horizontal state of a screen of the mobile phone, thus meeting diversified use requirements on the mobile phone support.

10 Claims, 6 Drawing Sheets

(56) References Cited

U.S. PATENT DOCUMENTS

| | | | |
|---|---|---|---|
| 2016/0183652 A1* | 6/2016 | Erlandsen Strange | H04M 1/04 220/756 |
| 2018/0013463 A1* | 1/2018 | Jeon | H04M 1/04 |
| 2018/0375981 A1* | 12/2018 | McCuskey | A45C 11/00 |
| 2021/0324994 A1* | 10/2021 | Liu | F16M 11/38 |

\* cited by examiner

MOBILE PHONE SUPPORT

The present disclosure relates to a technical field of mobile phone accessories, and in particular to an angle-adjustable mobile phone support.

BACKGROUND

With continuous improvement of living standards of people, substances are more and more abundant, an advent of smart mobile phones has brought development of mobile phone industry to a climax, and various smart mobile phones are sold on the market. The smart mobile phones not only realize basic functions of telephone communication of conventional mobile phones, but also realize various expansion functions of online, entertainment, games, etc., providing the people with a very good experience in use of the smart mobile phones. Along with emergence of a large number of the smart mobile phones, more and more mobile phone supports matched with the smart mobile phones are available in the market.

An existing mobile phone support generally achieves supporting and fixing of a mobile phone through a supporting frame. However, the angle of the mobile phone support cannot be adjusted, supporting stability is poor, and diversified use requirements of people cannot be met. Therefore, how to provide a mobile phone support that supports the mobile phone at multiple angles and is good in supporting stability is an urgent problem to those skilled in the art.

SUMMARY

In order to solve above problems, the present disclosure provides a mobile phone support, which realizes an adjustment of a mobile phone support angle through setting an adjustment component. At the same time, the present disclosure enriches use forms of the mobile phone support, enhances supporting stability of a mobile phone, thus meeting diversified use requirements of a user on the mobile phone support.

The present disclosure provides the mobile phone support, which is configured to support a mobile phone. The mobile phone support includes a housing and an adjusting assembly. The housing includes a top housing and a bottom housing. The top housing is opposite to the bottom housing. The top housing faces the mobile phone. An opening portion is formed on the bottom housing. The adjusting assembly is at least partially slidably connected between the bottom housing and the top housing. The adjusting assembly has a closed form and an open form relative to the opening portion. A rotation angle of the adjusting assembly is adjustable relative to the housing.

Furthermore, the adjusting assembly includes an adjusting mechanism and a supporting component. The adjusting mechanism and the supporting component are connected. The supporting component is pivotable relative to the adjusting mechanism, so that the supporting component is in the closed form or the open form relative to the opening portion.

Furthermore, a plurality of first limiting grooves is defined on a side surface, facing the adjusting mechanism, of the bottom housing. A first elastic telescopic component is disposed on a side surface, facing the bottom housing, of the adjusting mechanism. The first elastic telescopic component is embedded and fixed to any one of the plurality of first limiting grooves, so that the adjusting mechanism is suspended and positioned in any one of the first limiting grooves in a sliding process. Alternatively, a plurality of first elastic telescopic components is disposed on the side surface, facing the adjusting mechanism, of the bottom housing. A first limiting groove is defined on the side surface, facing the bottom housing, of the adjusting mechanism. The first limiting groove is embedded and fixed to the plurality of first elastic telescopic components, so that the adjusting mechanism is suspended and positioned on any one of the first elastic telescopic components in the sliding process.

Furthermore, the adjusting mechanism includes a sliding block and a rotating block. The sliding block and the rotating block are connected. The rotating block is rotatable relative to the sliding block in a plane where the sliding block is located or in a plane parallel to the plane where the sliding block is located.

Furthermore, an accommodating portion is disposed in a middle of the sliding block. A shape of the rotating block is matched with a shape of the accommodating portion. The rotating block is embedded in the accommodating portion of the sliding block.

Furthermore, a plurality of second limiting grooves is defined on a side surface, facing the rotating block, of the accommodating portion. A second elastic telescopic component is disposed on a side surface, facing the accommodating portion, of the rotating block. The second elastic telescopic component is embedded and fixed to the plurality of second limiting grooves, so that the rotating block is suspended and positioned in any one of the plurality of second limiting grooves in a rotating process. Alternatively, a plurality of second elastic telescopic components is disposed on the side surface, facing the rotating block, of the accommodating portion. A second limiting groove is defined on the side surface, facing the accommodating portion, of the rotating block. The second limiting groove is embedded and fixed to any one of the plurality of second elastic telescopic components, so that the rotating block is suspended and positioned on any one of the plurality of second elastic telescopic components in the rotating process.

Furthermore, a range of the rotation angle is 0-360 degrees.

Furthermore, the adjusting assembly further includes a rotating shaft. The rotating shaft is movably connected to the adjusting mechanism. The rotating shaft is movably connected to the supporting component. The adjusting mechanism is pivoted with the supporting component through the rotating shaft.

Furthermore, the accommodating portion is a through hole running through the sliding block or the accommodating portion is a U-shaped groove.

Furthermore, one end, distal from the adjusting mechanism, of the opening portion runs through the bottom housing, so that when the supporting component is in the closed form relative to the opening portion, the adjusting mechanism drives the supporting component to slide downwards.

Compared with prior art, by disposing the adjusting assembly at least partially slidably connected between the bottom housing and the top housing, the adjusting assembly is slid along a predetermined direction, which achieves an adjustment of a supporting angle of the mobile phone. Meanwhile, by adjusting the rotation angle of the adjusting assembly relative to the housing, a screen of the mobile phone is adjusted from a vertical state to a horizontal state or is adjusted from the horizontal state to the vertical state, which enhances the supporting stability after mutual conversion of the vertical state and the horizontal state of the screen of the mobile phone and enriches the use forms of the mobile phone support, thus meeting the diversified use requirements of a user on the mobile phone support.

DETAILED DESCRIPTION

In order to facilitate understanding of purpose, structure, features, efficacy and the like of the present disclosure, a mobile phone support of the present disclosure is further described in conjunction with drawings and specific embodiments.

Figure 1:
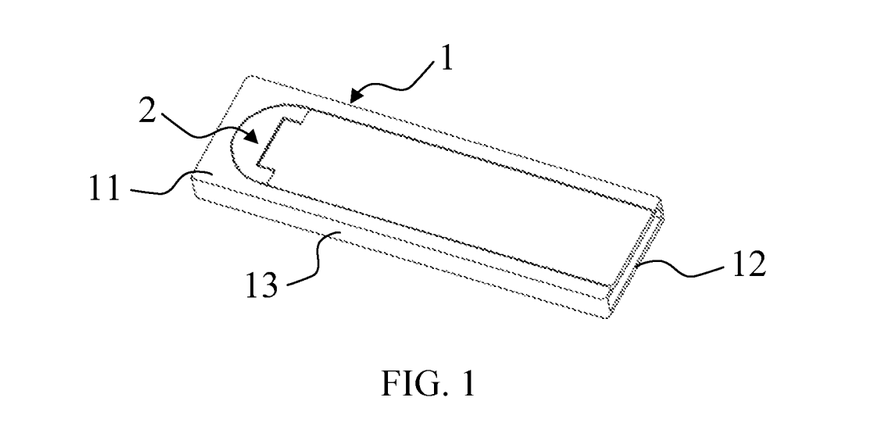
FIG. 1 is a perspective schematic diagram of a mobile phone support in which a sliding block does not slide downwards and a support component is in a closed form according to one embodiment of the present disclosure.
Figure 5:
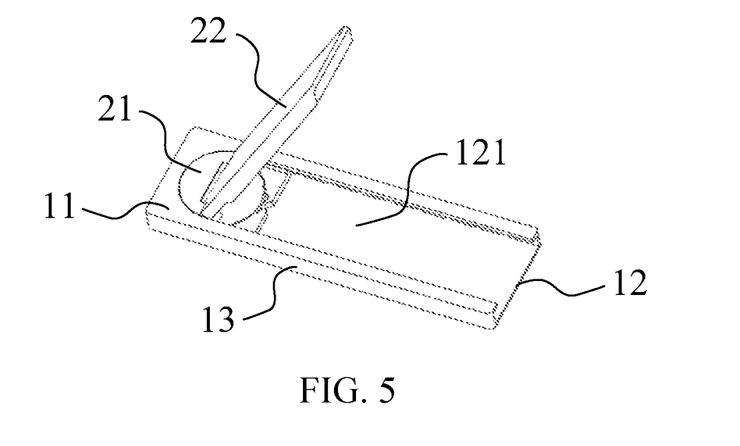
FIG. 5 is a perspective schematic diagram of the mobile phone support in which the sliding block does not slide downwards and the support component is in an open form according to one embodiment of the present disclosure.

As shown in FIG. 1 and FIG. 5, the present disclosure provides the mobile phone support, which is configured to support a mobile phone. The mobile phone support includes a housing 1 and an adjusting assembly 2, and the adjusting assembly 2 is disposed on the housing 1. The housing 1 includes a top housing 11, a bottom housing 12, and a side surface 13. The top housing 11 is opposite to the bottom housing 12. The top housing 11 is connected with the bottom housing 12 through the side surface 13 of the housing. The bottom housing 12 and the side surface 13 are integrally formed, and then the bottom housing 12 and the side surface 13 are assembled with the top housing 11 to form the housing 1. Alternatively, the top housing 11 and the side surface 13 of the housing are integrally formed, and then the top housing 11 and the side surface 13 are assembled with the bottom housing 12 to form the housing 1. Alternatively, the top housing 11, the bottom housing 12, and the side surface 13 of the housing are respectively independent portions, and the three independent portions are assembled to form the housing 1. An assembly method is fastener assembly, welding assembly, riveting assembly, etc., which is not limited thereto. The top housing 11 faces the mobile phone. An opening portion 121 is formed on the bottom housing 12.

As shown in FIGS. 1, 3, 5, and 6, the adjusting assembly 2 has a closed form and an open form relative to the opening portion 121. Specifically, the adjusting assembly 2 includes an adjusting mechanism 21 and a supporting component 22. The adjusting mechanism 21 and the supporting component 22 are connected. The supporting component 22 is pivotable relative to the adjusting mechanism 21, so that the supporting component 22 is in the closed form or the open form relative to the opening portion 121. A width of the supporting component 22 is less than or equal to a width of the opening portion 121, so that the supporting component 22 is accommodated in the opening portion 121.

The adjusting assembly 2 is at least partially slidably connected between the bottom housing 12 and the top housing 11. In one optional embodiment, a sliding groove 14 is defined between the bottom housing 12 and the top housing 11, and the adjusting assembly 2 slides between the bottom housing 12 and the top housing 11 through the sliding groove 14. In one optional embodiment, a plurality of first limiting grooves is defined on a side surface, facing the adjusting mechanism 21, of the bottom housing 12. A first elastic telescopic component is disposed on a side surface, facing the bottom housing 12, of the adjusting mechanism 21. The first elastic telescopic component is embedded and fixed to any one of the plurality of first limiting grooves, so that the adjusting mechanism 21 is suspended and positioned in any one of the plurality of first limiting grooves in sliding process. Alternatively, a plurality of first elastic telescopic components is disposed on the side surface, facing the adjusting mechanism 21, of the bottom housing 12. A first limiting groove is defined on the side surface, facing the bottom housing 12, of the adjusting mechanism 21. The first limiting groove is embedded and fixed to any one of the plurality of first elastic telescopic components, so that the adjusting mechanism 21 is suspended and positioned on any one of the first elastic telescopic components in sliding process.

Figure 2:
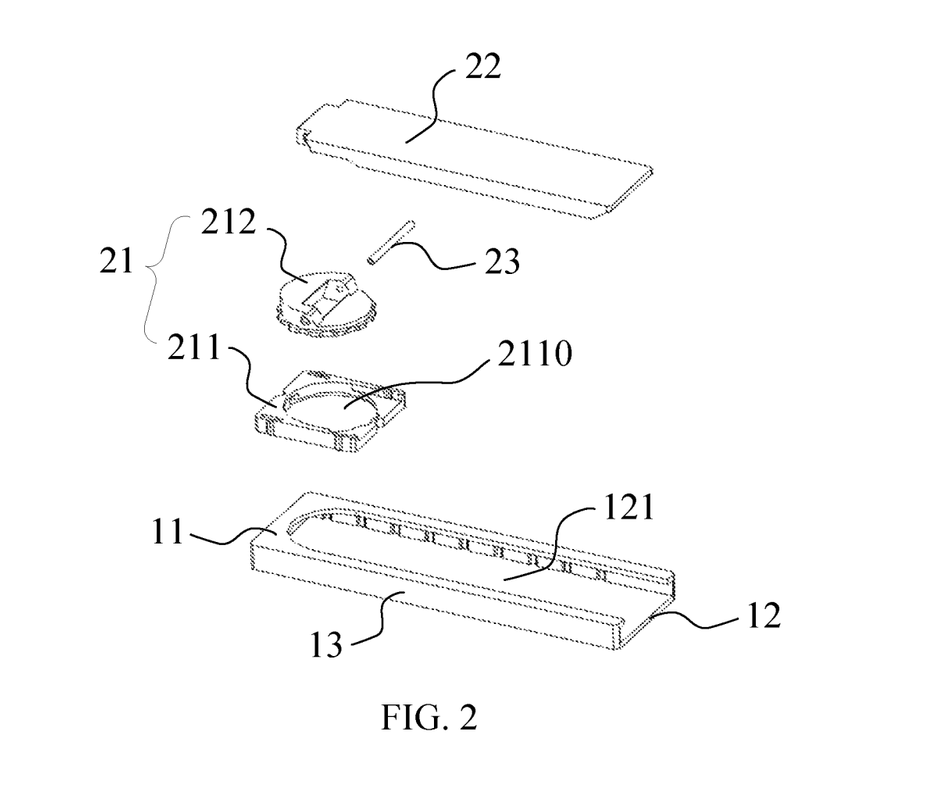
FIG. 2 is an exploded schematic diagram of FIG. 1.
Figure 3:
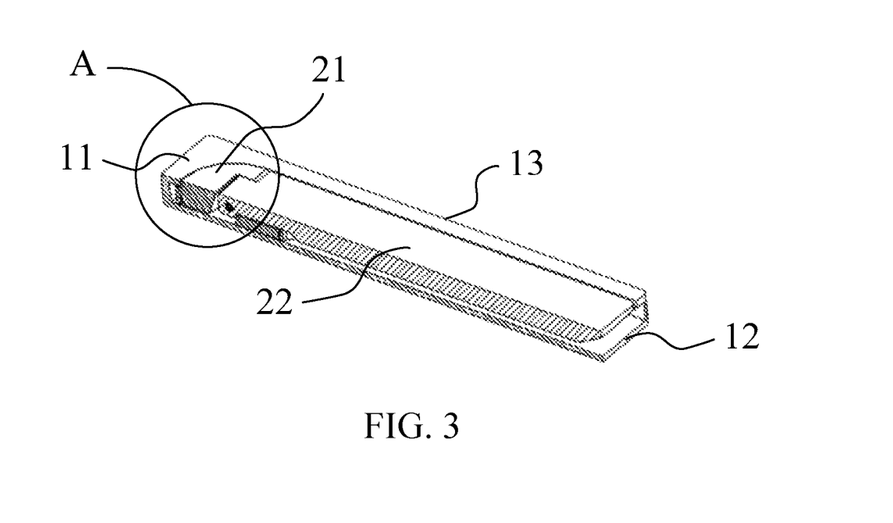
FIG. 3 is a cross-sectional schematic diagram of FIG. 1.

As shown in FIG. 1 and FIG. 2, the adjusting assembly 2 further includes a rotating shaft 23. The rotating shaft 23 is movably connected to the adjusting mechanism 21. The rotating shaft 23 is movably connected to the supporting component 22. The adjusting mechanism 21 is pivoted with the supporting component 22 through the rotating shaft 23. Specifically, a length of the rotating shaft 23 is slightly larger than the width of the supporting component 22. A through hole running through two side surfaces of the supporting component is defined on one end of the supporting component 22. The rotating shaft 23 is sleeved in the through hole. Two ends of the rotating shaft 23 are exposed from the through hole for a certain length. A groove matched with the rotating shaft 23 and the supporting component 22 is defined on the adjusting mechanism 21. The two ends of the rotating shaft 23 are embedded into the groove, so that the supporting component 22 is pivoted to the adjusting mechanism 21 through the rotating shaft 23. It is understood that a pivoting mode of the supporting component 22 and the adjusting mechanism 21 is not limited thereto.

Figure 4:
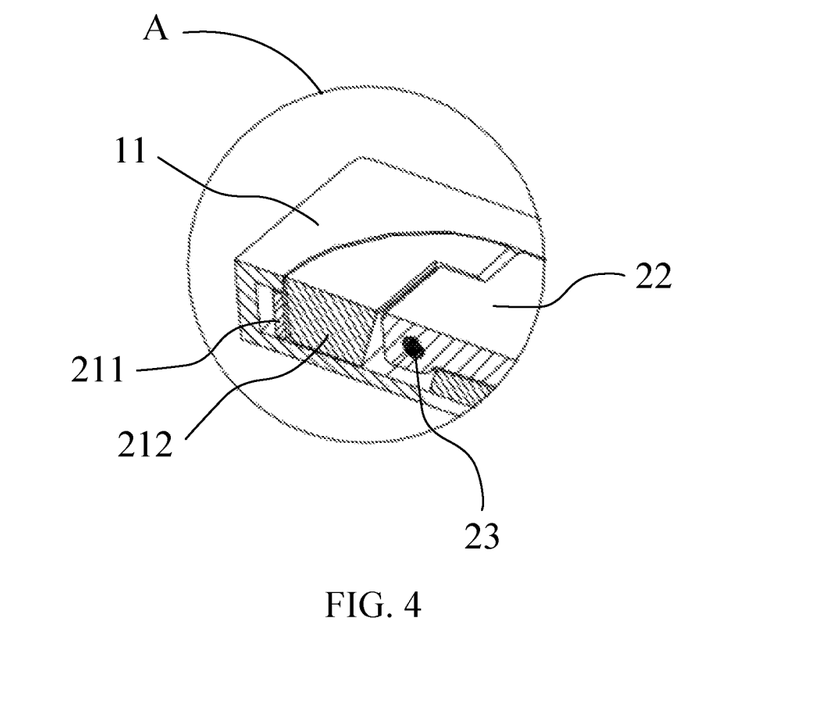
FIG. 4 is an enlarged schematic diagram of a portion A shown in FIG. 3.

As shown in FIGS. 1, 2, and 4, a rotation angle of the adjusting assembly 2 is adjustable relative to the housing 1. A range of the rotation angle is 0-360 degrees. Specifically, the adjusting mechanism 21 includes a sliding block 211 and a rotating block 212. The sliding block 211 and the rotating block 212 are connected. The rotating block 212 is rotatable relative to the sliding block 211 within a plane where the sliding block 211 is located or in a plane parallel to the plane where the sliding block 211 is located. An accommodating portion 2110 is disposed in a middle of the sliding block 211. A shape of the rotating block 212 is matched with a shape of the accommodating portion 2110. The rotating block 212 is embedded in the accommodating portion 2110 of the sliding block 211. In one optional embodiment, a plurality of second limiting grooves is defined on a side surface, facing the rotating block 212, of the accommodating portion 2110. A second elastic telescopic component is disposed on the side surface, facing the accommodating portion 2110, of the rotating block 212. The second elastic telescopic component is embedded and fixed to any one of the plurality of second limiting grooves, so that the rotating block 212 is suspended and positioned in any one of the plurality of second limiting grooves in a rotating process. Alternatively, a plurality of second elastic telescopic components is disposed on the side surface, facing the rotating block 212, of the accommodating portion 2110. A second limiting groove is defined on the side surface, facing the accommodating portion 2110, of the rotating block 212. The second limiting groove is embedded and fixed to any one of the plurality of second elastic telescopic components, so that the rotating block 212 is suspended and positioned on any one of the plurality of second elastic telescopic components in the rotating process. Certainly, in other embodiments, a suspending and positioning manner between the rotating block 212 and the accommodating portion 2110 is further in other forms.

In one optional embodiment, the accommodating portion 2110 is a through hole running through the sliding block 211 or the accommodating portion 2110 is a U-shaped groove.

As shown in FIGS. 1, 2, 4, and 6, the sliding block 211 is clamped in a sliding groove 14 formed by the bottom housing 12 and the top housing 11. When the rotating block 212 is embedded in the accommodating portion 2110 in the middle of the sliding block 211, a portion of the rotating block 212 is protruded out of a surface of the accommodating portion 2110, and the portion of the rotating block 212 is accommodated in the opening portion 121. The supporting component 22 is pivotally connected to the rotating block 212 through the rotating shaft 23, so that the sliding block 211 drives the supporting component 22 to slide. In one optional embodiment, one end, away from the sliding block 211, of the opening portion 121 runs through the bottom housing 12, so that when the supporting component 22 is in the closed form relative to the opening portion 121, the sliding block 211 drives the supporting component 22 to slide downwards. In the embodiment, the width of the supporting component 22 is equal to the width of the opening portion 121. The shape of the rotating block 212 and the shape of the supporting component 22 match a shape of the opening portion 121. When the sliding block 211 does not slide downwards, the rotating block 212 and the supporting component 22 are accommodated in the opening portion 121, which makes an appearance of the mobile phone support attractive. The rotating block 212 and the supporting component 22 of the adjusting mechanism 21 do not protrude outwards from an outer side surface of the bottom housing 12. That is, when the supporting component 22 is in the closed form, the mobile phone support is flatly placed on an outer plane.

In one optional embodiment, a pivoting angle of the support component 22 relative to the adjustment mechanism 21 is a fixed angle. In the embodiment, the fixed angle is 70 degrees. Of course, according to actual requirements, the fixed angle is further set to other angles, such as 60 degrees and 80 degrees, which is not limited thereto.

Figure 6:
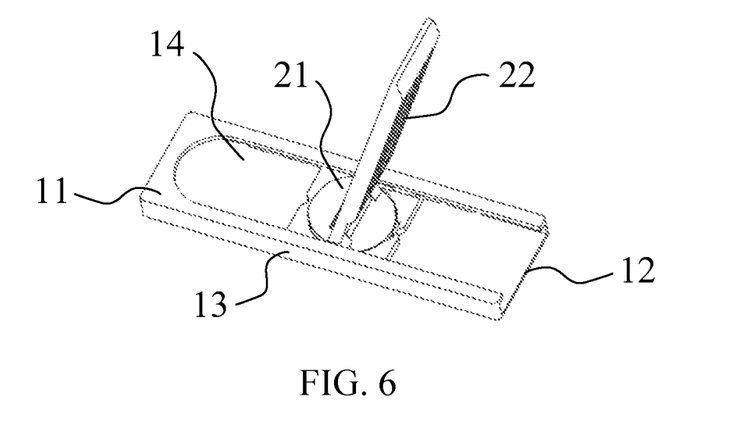
FIG. 6 is a perspective schematic diagram of the mobile phone support in which the sliding block slides downwards by half and the support component is in the open form according to one embodiment of the present disclosure.
Figure 7:
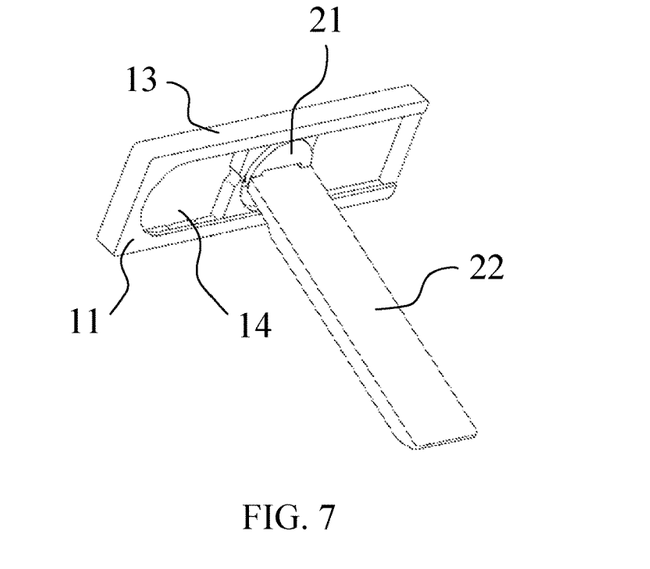
FIG. 7 is a perspective schematic diagram of the mobile phone support in which the sliding block slides downwards by half and the support component rotates 90 degrees relative to the housing in the open form according to one embodiment of the present disclosure.
Figure 8:
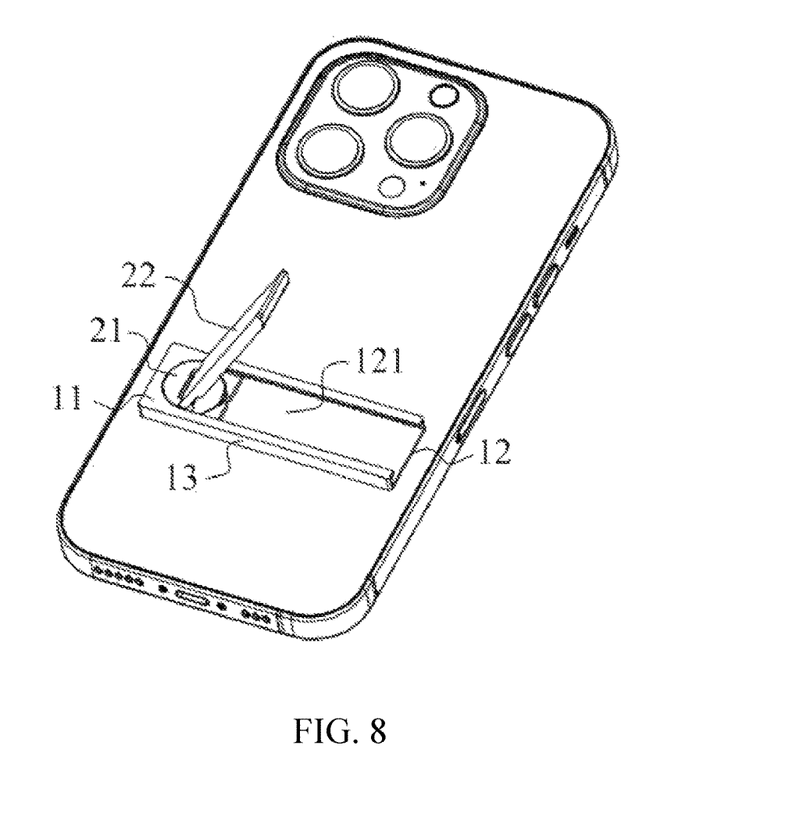
FIG. 8 is a perspective schematic diagram of the mobile phone support pasting on a back surface of a mobile phone, in which the sliding block does not slide downwards and the support component is in an open form according to one embodiment of the present disclosure.
Figure 9:
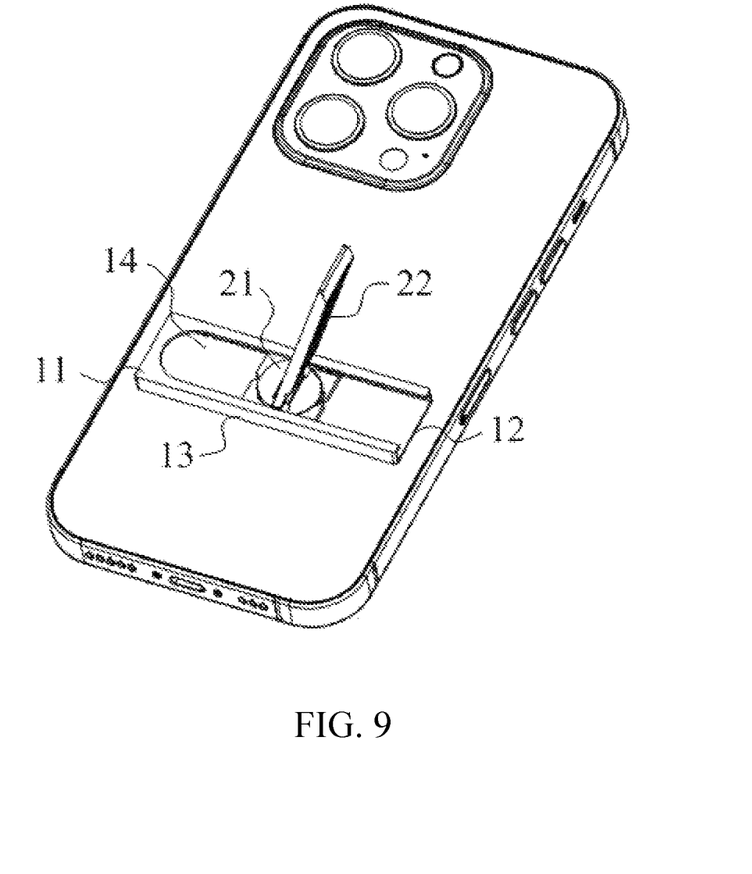
FIG. 9 is a perspective schematic diagram of the mobile phone support pasting on the back surface of the mobile phone, where the sliding block slides downwards by half and the support component is in the open form according to one embodiment of the present disclosure.
Figure 10:
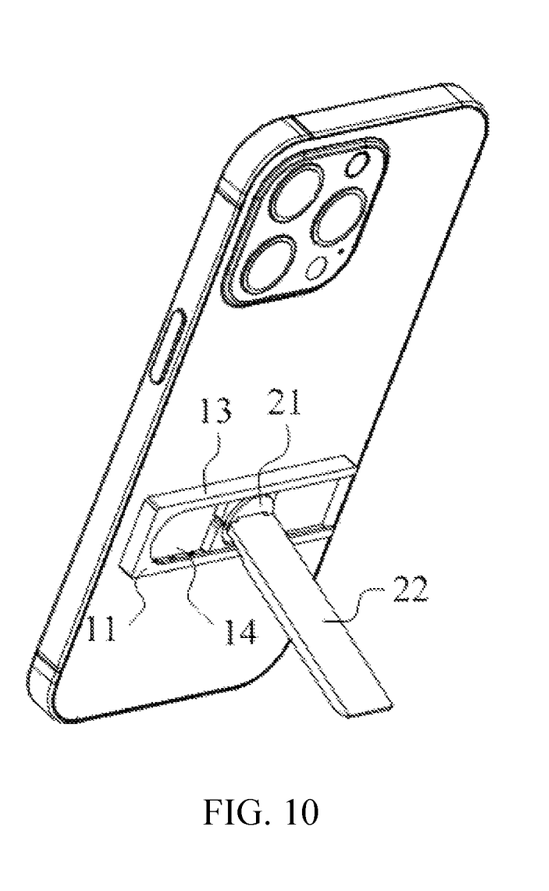
FIG. 10 is a perspective schematic diagram of the mobile phone support pasting on the back surface of the mobile phone in which the sliding block slides downwards by half and the support component rotates 90 degrees relative to the housing in the open form according to one embodiment of the present disclosure.

FIG. 1 is a schematic diagram of the mobile phone support in which the support component 22 is in the closed form. FIG. 5 is a schematic diagram of the mobile phone support in which the support component 22 is in the open form and FIG. 8 is a schematic diagram of the mobile phone support pasting on a back surface of the mobile phone in which the support component is in the open form when the sliding block 211 does not slide downwards. FIG. 6 is a schematic diagram of the mobile phone support in which the support component 22 is in the open form. FIG. 9 is a schematic diagram of the mobile phone support pasting on the back surface of the mobile phone in which the support component is in the open form when the sliding block 211 slides downwards by half. FIG. 7 is a schematic diagram of the mobile phone support in which the support component 22 rotates 90 degrees relative to the housing in the open form and FIG. 10 is a schematic diagram of the mobile phone support pasting on the back surface of the mobile phone in which the support component rotates 90 degrees relative to the housing in the open form when the sliding block 211 slides downwards by half. The mobile phone support is generally attached to or pasted on the back surface of the mobile phone. Taking the support component 22 as an example, by pivoting outwards by 70 degrees, the support component 22 is placed in the open form. When the sliding block 211 does not slide downwards or is slid downwards by half, and the support component 22 is in the open form, the mobile phone is horizontally placed to meet use scenes of a user, such as watching movies and video clips. When the sliding block 211 is slid downwards by half and the rotating block 212 is rotated by 90 degrees, and the support component 22 is in the open form, the mobile phone is vertically placed to meet the use scenes of the user, such as viewing messages, replying to messages, browsing web pages, etc. When the support component 22 is in the closed form, no matter where the sliding block 211 slides, a flat placing use of the mobile phone support is not affected. When the support component 22 is pivoted outwards by 70 degrees, requirements of various scenes of the user are well met.

Certainly, it should be understood that FIGS. 5-10 only show several representative use forms of the adjusting assembly 2. It is noted that the use forms of the adjusting assembly 2 and corresponding use scenario are not limited thereto. By disposing the adjusting assembly, the adjusting assembly is slid along a predetermined direction, which achieves an adjustment of a supporting angle of the mobile phone. Meanwhile, by adjusting the rotation angle of the adjusting assembly relative to the housing, a screen of the mobile phone is adjusted from a vertical state to a horizontal state or the screen of the mobile phone is adjusted from the horizontal state to the vertical state, which enhances the supporting stability after mutual conversion of the vertical state and the horizontal state of the screen of the mobile phone, and enriches the use forms of the mobile phone support, thus meeting the diversified use requirements of the user on the mobile phone support.

The above detailed description is merely an illustration of optional embodiments of the present disclosure, which should not be regarded as a limit to a scope of the present disclosure. Therefore, equivalent technical changes made by using the specification and drawings are all included in the scope of the present disclosure.

What is claimed is:

1. A mobile phone support configured to support a mobile phone, comprising:
   a housing; and
   an adjusting assembly;
   wherein the housing comprises a top housing and a bottom housing; the top housing is opposite to the bottom housing; the top housing faces the mobile phone; an opening portion is formed on the bottom housing;
   the adjusting assembly is at least partially slidably connected between the bottom housing and the top housing; the adjusting assembly has a closed form and an open form relative to the opening portion, and a rotation angle of the adjusting assembly is adjustable relative to the housing;
   wherein the adjusting assembly comprises an adjusting mechanism and a supporting component; the adjusting mechanism and the supporting component are connected; and the supporting component is pivotable relative to the adjusting mechanism, so that the supporting component is in the closed form or the open form relative to the opening portion;
   wherein a plurality of first limiting grooves is defined on a side surface of the bottom housing facing the adjusting mechanism; a first elastic telescopic component is disposed on a side surface of the adjusting mechanism facing the bottom housing; the first elastic telescopic component is embedded and fixed to any one of the plurality of first limiting grooves, so that the adjusting mechanism is suspended and positioned in any one of the plurality of first limiting grooves in a sliding process; or, a plurality of first elastic telescopic components is disposed on the side surface of the bottom housing facing the adjusting mechanism; a first limiting groove is defined on the side surface of the adjusting mechanism facing the bottom housing; and the first limiting groove is embedded and fixed to any one of the plurality of first elastic telescopic components, so that the adjusting mechanism is suspended and positioned on any one of the plurality of first elastic telescopic components in the sliding process.

2. The mobile phone support according to claim 1, wherein the adjusting mechanism comprises a sliding block and a rotating block; the sliding block and the rotating block are connected; the rotating block is rotatable relative to the sliding block in a plane where the sliding block is located or in a plane parallel to the plane where the sliding block is located.

3. The mobile phone support according to claim 2, wherein an accommodating portion is disposed in a middle of the sliding block; a shape of the rotating block is matched with a shape of the accommodating portion; and the rotating block is embedded in the accommodating portion of the sliding block.

4. The mobile phone support according to claim 3, wherein a plurality of second limiting grooves is defined on a side surface of the accommodating portion facing the rotating block; a second elastic telescopic component is disposed on a side surface of the rotating block facing the accommodating portion; the second elastic telescopic component is embedded and fixed to any one of the plurality of second limiting grooves, so that the rotating block is suspended and positioned in any one of the plurality of second limiting grooves in a rotating process; or
   a plurality of second elastic telescopic components is disposed on the side surface of the accommodating portion facing the rotating block; a second limiting groove is defined on the side surface of the rotating block facing the accommodating portion; and the second limiting groove is embedded and fixed to any one of the plurality of second elastic telescopic components, so that the rotating block is suspended and positioned on any one of the plurality of second elastic telescopic components in the rotating process.

5. The mobile phone support according to claim 1, wherein a range of the rotation angle is 0-360 degrees.

6. The mobile phone support according to claim 1, wherein the adjusting assembly further comprises a rotating shaft; the rotating shaft is movably connected to the adjusting mechanism; the rotating shaft is movably connected to the supporting component, and the adjusting mechanism is pivoted with the supporting component through the rotating shaft.

7. The mobile phone support according to claim 3, wherein the accommodating portion is a through hole running through the sliding block or the accommodating portion is a U-shaped groove.

8. The mobile phone support according to claim 1, wherein one end of the opening portion away from the adjusting mechanism runs through the bottom housing, so that when the supporting component is in the closed form relative to the opening portion, the adjusting mechanism drives the supporting component to slide downwards.

9. A mobile phone support configured to support a mobile phone, comprising:
   a housing; and
   an adjusting assembly;
   wherein the housing comprises a top housing and a bottom housing; the top housing is opposite to the bottom housing; the top housing faces the mobile phone; an opening portion is formed on the bottom housing;
   the adjusting assembly is at least partially slidably connected between the bottom housing and the top housing; the adjusting assembly has a closed form and an open form relative to the opening portion, and a rotation angle of the adjusting assembly is adjustable relative to the housing;
   wherein the adjusting assembly comprises an adjusting mechanism and a supporting component; the adjusting mechanism and the supporting component are connected; and the supporting component is pivotable relative to the adjusting mechanism, so that the supporting component is in the closed form or the open form relative to the opening portion;
   wherein the adjusting mechanism comprises a sliding block and a rotating block; the sliding block and the rotating block are connected; the rotating block is rotatable relative to the sliding block in a plane where the sliding block is located or in a plane parallel to the plane where the sliding block is located;
   wherein an accommodating portion is disposed in a middle of the sliding block; a shape of the rotating block is matched with a shape of the accommodating portion; and the rotating block is embedded in the accommodating portion of the sliding block;
   wherein a plurality of limiting grooves is defined on a side surface of the accommodating portion facing the rotating block; an elastic telescopic component is disposed on a side surface of the rotating block facing the accommodating portion; the elastic telescopic component is embedded and fixed to any one of the plurality of limiting grooves, so that the rotating block is suspended and positioned in any one of the plurality of limiting grooves in a rotating process; or a plurality of elastic telescopic components is disposed on the side surface of the accommodating portion facing the rotating block; a limiting groove is defined on the side surface of the rotating block facing the accommodating portion; and the limiting groove is embedded and fixed to any one of the plurality of elastic telescopic components, so that the rotating block is suspended and positioned on any one of the plurality of elastic telescopic components in the rotating process.

10. The mobile phone support according to claim 9, wherein the accommodating portion is a through hole running through the sliding block or the accommodating portion is a U-shaped groove.

\* \* \* \* \*